United States Patent
Matsuda et al.

(10) Patent No.: US 6,345,763 B1
(45) Date of Patent: Feb. 12, 2002

(54) IMAGE READING APPARATUS FOR READING A BOOKFORM DOCUMENT PLACED ON A DOCUMENT TABLE IN FACE-UP STATE

(75) Inventors: Shinya Matsuda, Kyoto; Fuminori Moro, Toyokawa; Hiroshi Nagashima, Atsugi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/220,768

(22) Filed: Dec. 28, 1998

Related U.S. Application Data

(62) Division of application No. 08/780,665, filed on Jan. 7, 1997, now abandoned.

(30) Foreign Application Priority Data

Jan. 10, 1996 (JP) .......................................... P8-020500

(51) Int. Cl.[7] ................................................ G06K 7/10
(52) U.S. Cl. .................... 235/459; 250/208.1; 355/362; 355/377
(58) Field of Search ................................ 235/459, 454, 235/470, 456, 462.14; 250/208.1, 569.06, 569.08, 559.04, 559.05, 559.07, 216, 235, 234; 355/25, 75, 82; 399/362, 365, 377, 379, 370, 371, 372, 376; 358/471, 474, 488, 497

(56) References Cited

U.S. PATENT DOCUMENTS

| | | | |
|---|---|---|---|
| 3,674,363 A | 7/1972 | Baller et al. ............... 355/75 X |
| 4,260,248 A | 4/1981 | Murata et al. ............. 355/75 X |
| 4,436,402 A | 3/1984 | Seimiya et al. ........... 355/75 X |
| 4,675,741 A | 6/1987 | Shinohara ................... 358/256 |
| 4,696,563 A | 9/1987 | Shibusawa ..................... 355/8 |
| 4,743,946 A | 5/1988 | Nishimori et al. ......... 355/14 C |
| 4,803,505 A * | 2/1989 | Saijo et al. .................... 354/80 |
| 4,935,779 A | 6/1990 | Sawada ....................... 355/228 |
| 5,084,611 A | 1/1992 | Okisu et al. ............. 250/208.1 |
| 5,134,440 A | 7/1992 | Nishimori .................... 355/218 |
| 5,184,733 A | 2/1993 | Arnarson et al. ........... 209/585 |
| 5,194,729 A * | 3/1993 | Okisu et al. ............. 250/222.1 |
| 5,276,530 A | 1/1994 | Siegel ......................... 358/406 |
| 5,307,423 A * | 4/1994 | Gupta et al. ................. 235/379 |
| 5,311,248 A | 5/1994 | Iwata ........................ 355/75 X |
| 5,362,958 A | 11/1994 | Ando ....................... 250/208.1 |
| 5,377,019 A * | 12/1994 | Okisu et al. ................. 358/464 |
| 5,416,609 A | 5/1995 | Matsuda et al. ............. 358/474 |
| 5,616,914 A | 4/1997 | Matsuda ................... 250/208.1 |
| 5,760,925 A * | 6/1998 | Saund et al. ................. 358/497 |
| 5,764,383 A * | 6/1998 | Saund et al. ................. 358/497 |
| 5,774,237 A | 6/1998 | Nako ......................... 358/471 |
| 5,805,272 A * | 9/1998 | Nozawa et al. ................ 355/25 |
| 5,863,209 A * | 1/1999 | Kim ........................... 434/428 |
| 6,256,411 B1 * | 7/2001 | Iida ............................ 382/203 |

FOREIGN PATENT DOCUMENTS

| | | | |
|---|---|---|---|
| JP | 59-30550 | * | 2/1984 |
| JP | 4-238457 | | 8/1992 |
| JP | 09-149207 | * | 6/1997 |

* cited by examiner

*Primary Examiner*—Michael G. Lee
*Assistant Examiner*—Diane I. Lee
(74) *Attorney, Agent, or Firm*—McDermott, Will & Emery

(57) ABSTRACT

An image reading apparatus which reads out a document, such as as a book, placed face-up and opened on a document table. The apparatus includes an image reading device for reading out the document image placed on the document table, a mirror for imaging the document upper side plane, a projecting device which projects marks onto the document and mirror, and an image processing unit. A document characterized portion imaged on the mirror is read out by the image reading device and the image processing unit rectifies image distortion of the read out document image based on the characterized portion.

6 Claims, 9 Drawing Sheets

SCANNING DIRECTION

OPTICAL PATH

F I G. 6
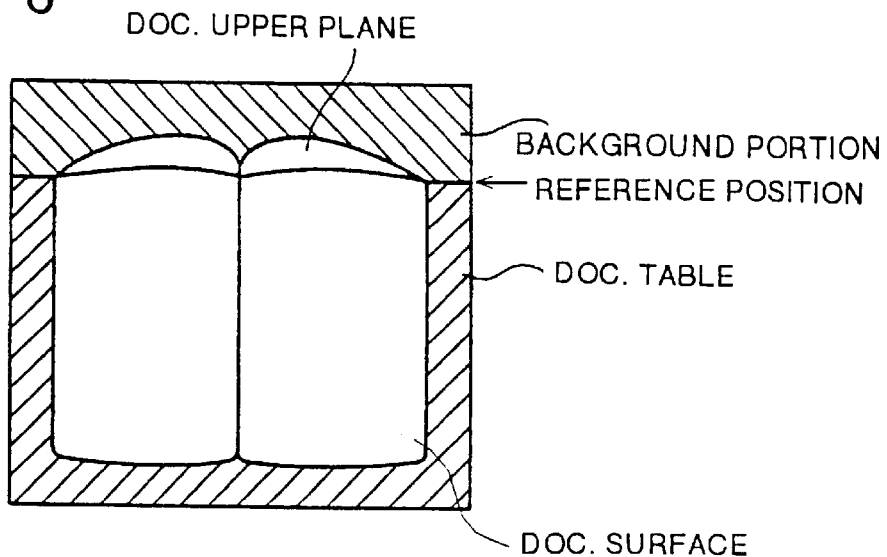
F I G. 7
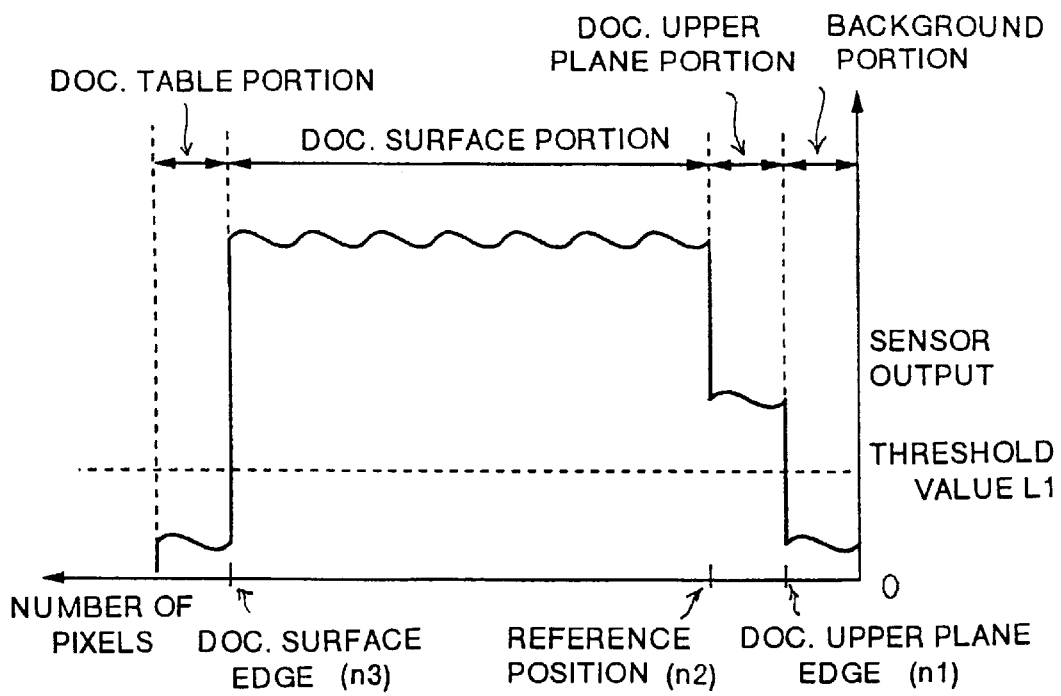

IMAGE READING APPARATUS FOR READING A BOOKFORM DOCUMENT PLACED ON A DOCUMENT TABLE IN FACE-UP STATE

This is a divisional application of Ser. No. 08/780,665, filed Jan. 7, 1997, now abandoned.

BACKGROUND OF THE INVENTION

1. Field of the Invention

The present invention relates to an image reading apparatus for reading a bookform document which makes it easy to place a bookform document on an accurate position of a document table in face-up opened state.

2. Description of the Prior Art

In a conventional image reading apparatus, which reads a document placed opened and face-up on a document table, center marks for positioning the document are arranged on two positions, front-ward and backward of the document table, and positioning of the document can be executed by fitting the document bound potion with the marks.

Further, in a conventional image reading apparatus wherein a document is placed opened and face-down, scales indicating sizes are arranged on two positions, front-ward and sideward of the document table, and the positioning of a document can be executed by fitting the document corners with the scales.

However, according to the above-mentioned conventional image reading apparatus wherein a document is placed opened and face-up, when a document having a thickness such as encyclopedia is placed, there has been a problem that positioning the document tends to be inaccurate due to an unevenness of the height of document's bound portion and the height of the center marks drawn on the document table. Especially, the problem has been serious when the document table is moved vertically, and the document is unstable. Furthermore, concerning a small size document such as a paperback, there has been the same kind of problem as there is a distance between the documents' bound portion and the center marks. Moreover, according to the above-mentioned image reading apparatus in which a document is placed opened and face-down, when a thick book is placed on the document table, there has been the same kind of problems as the document's bound portion lifts up from a glass plane of the document table.

SUMMARY OF THE INVENTION

The present invention is made to solve the abovementioned problem. An object of the present invention is to provide an image reading apparatus wherein an easy and accurate positioning is executed concerning a document placed opened and upward to be read out, even though the document has a thickness such as a book.

In accomplishing the above-mentioned object, the image reading apparatus wherein a document placed opened and face-up is read out, comprising a document table on which a document is placed, an image reading means for reading out an image of the document placed on the document table, a projection means for projecting the document upper plane image on the image reading means, and a indication means for positioning the document on the document table based on a comparison with a mirror image of the document upper plane mirrored on the projection means.

In this construction, the image reading means reads out an image of a document placed on the document table opened and face-up and also the document upper plane image mirrored on the image reading means by the projection means. The indication means is drawn on the projection means for positioning a document on the document table. Therefore, an operator can execute positioning of a document on the document table easily and accurately by comparing the indication means drawn on the projection means and a mirror image of the document upper plane mirrored on the projection means even though the document is thick such as an encyclopedia or it is small size such as a paperback.

BRIEF DESCRIPTION OF THE DRAWINGS

FIG. 6 is a view showing an example of an image data of a document which is read out, FIG. 7 is a view showing an exemplified output of one line in main-scanning direction, which is read out by an image pickup sensor.

DETAILED DESCRIPTION OF THE PREFERRED EMBODIMENT

An image reading apparatus according to the first embodiment of the present invention will be described with reference to the accompanying drawings.

Figure 1:
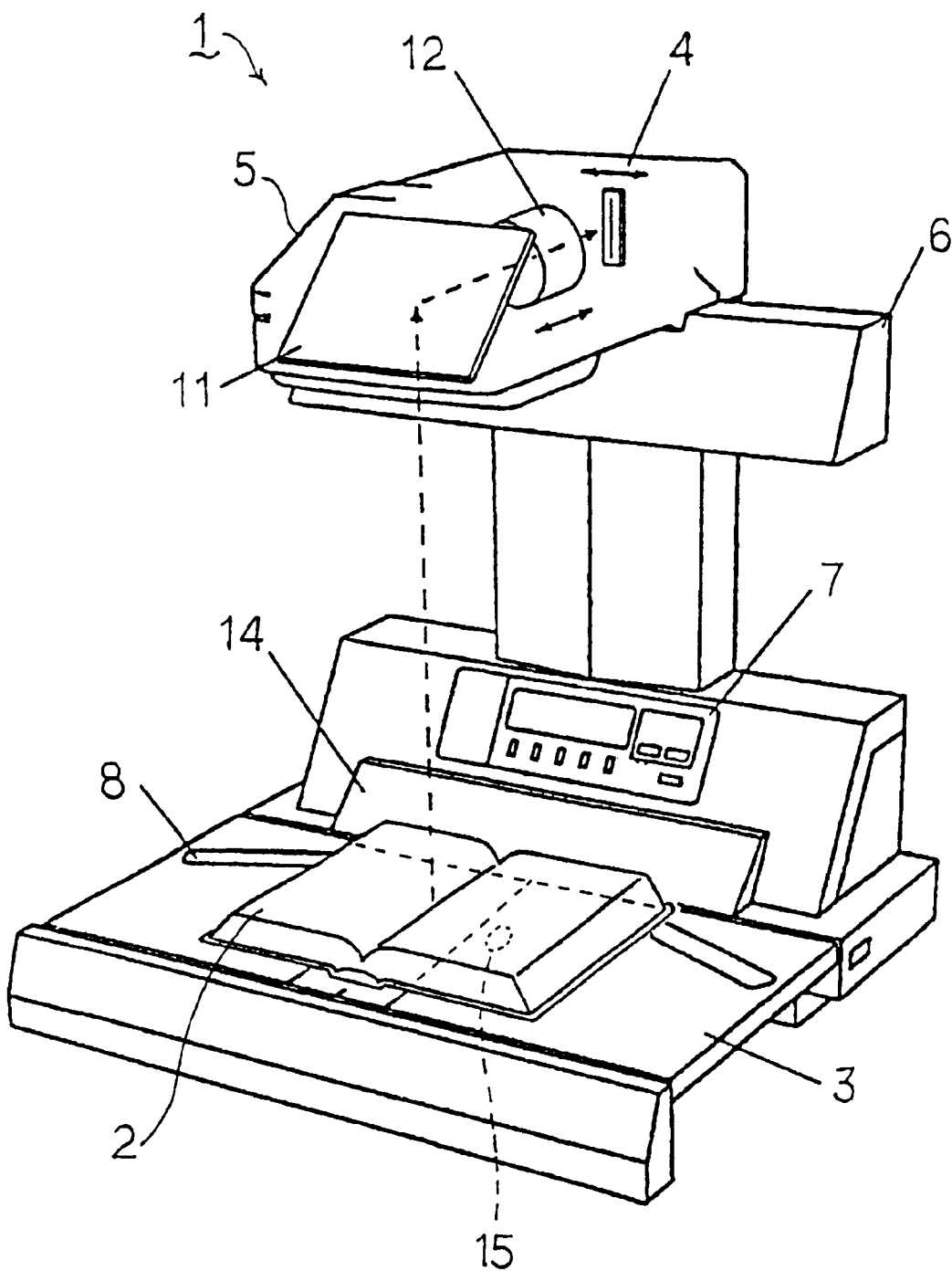
FIG. 1 is an overall constructional view of an image reading apparatus in an embodiment according to the present invention.

FIG. 1 shows an overall construction of the image reading apparatus. An image reading apparatus 1 has a document table 3 wherein a document 2 such as books and files are placed opened and face-up, and a photographing camera unit 5 is disposed above the document table 3, and the photographing camera unit 5 reads out a document by scanning of an image pickup sensor 4 composed of CCD (Charge Coupled Device) line sensor and the like. Further, an illumination unit 6 for illuminating a document is arranged rearward and upward of the document table 3, and an operation unit 7 for setting up conditions on image reading and the like is arranged. A start key 8 for starting reading operation is disposed on the document table 3, and a reflection mirror 11 and a projection lens 12, which is driven by lens drive device (not shown), are arranged. Moreover, a distance measuring mirror 14 (projection means) is disposed rearward on the document table 3 for projecting a document upper side plane on the image pickup sensor 4 and detecting a document height by use of the projected image. On the distance measuring mirror 14, a indication means for positioning the document 2 on the document table 3 are drawn (described in detail later).

In the above-mentioned construction, an illuminating light which is reflected on the surface of the document 2 becomes a document image, and the optical path is changed at the reflection mirror 11 in the photographing camera unit 5, and then it is imaged on the image pickup sensor 4 by the projection lens 12, and here it is converted to electric signals. A two dimensional image of the document is obtained by scanning of the image pickup sensor 4 in sub-scanning direction (lateral direction shown with an arrow in FIG. 1).

Figure 2:
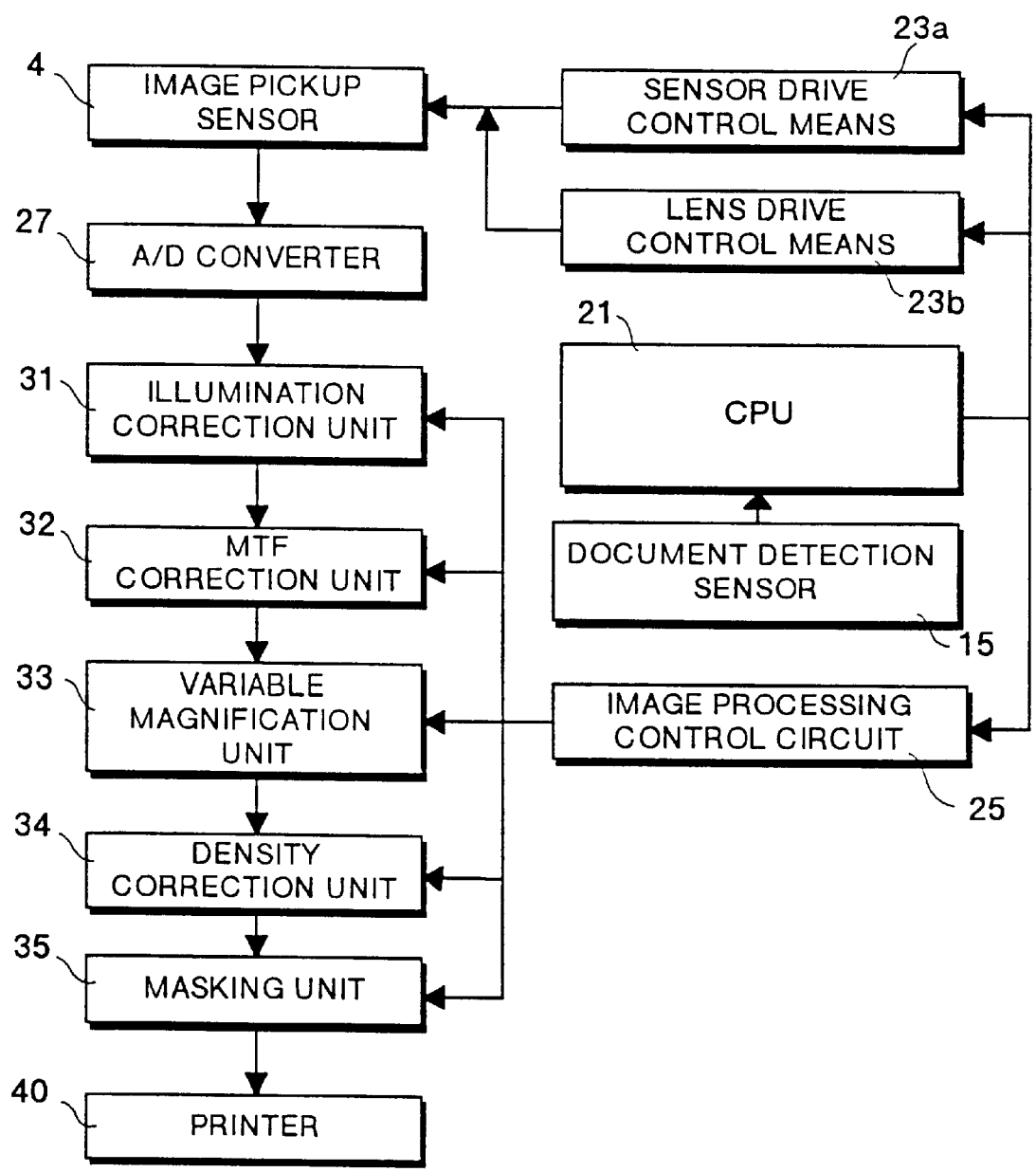
FIG. 2 is a block diagram of a control circuit of the image reading apparatus, FIGS. 3(*a*), FIG. 3(*b*), FIG. 3(*c*) and FIG. 3(*d*) are flowcharts showing schematic operations of the image reading apparatus.

FIG. 2 is a block diagram of a control circuit of the image reading apparatus 1. The apparatus 1 comprises a CPU (Central Processing Unit) 21 for controlling the whole apparatus, and a sensor drive control means 23a, a lens drive control means 23b, an image processing control circuit 25, a document detection sensor 15, and the like. The CPU 21 controls the sensor drive control means 23a in order to read out a document by an optical scanning, and it executes pre-scanning and main-scanning operation. An image signal, which is read out by the image pickup sensor 4 at the pre-scanning, is converted from analog to digital at an A/D converter 27, and then it is memorized temporally in a memory for calculating (not shown). The CPU 21 makes a brightness histogram based on the read out image signals as described later, and by use of the histogram, a ground brightness, threshold value of the brightness in letters' part, and existence degree of letters' part are calculated. The CPU 21 executes various kinds of proceedings by controlling the image processing control circuit 25 based on these information.

The image processing control circuit 25 controls an illumination correction unit 31, a MTF correction unit 32, a variable magnification unit 33, a density correction unit 34, and a masking unit 35. Image signals, which have been processed with these various kinds of proceedings, are output to an output apparatus, a printer 40, through a binding margin control means (not shown). The printer 40 outputs a hard copy of images by printing out the read out image data on papers. Further, the document detection sensor 15 is composed of a light receiving sensor, which is arranged near the center of the document table 3, and although it outputs electric signals when a document is not placed on it due to incident light to the sensor, it does not output electric signals when a document is placed on. The CPU 21 Judges whether a document is placed or not by detecting whether the electric signals are outputted or not.

Figure 3:
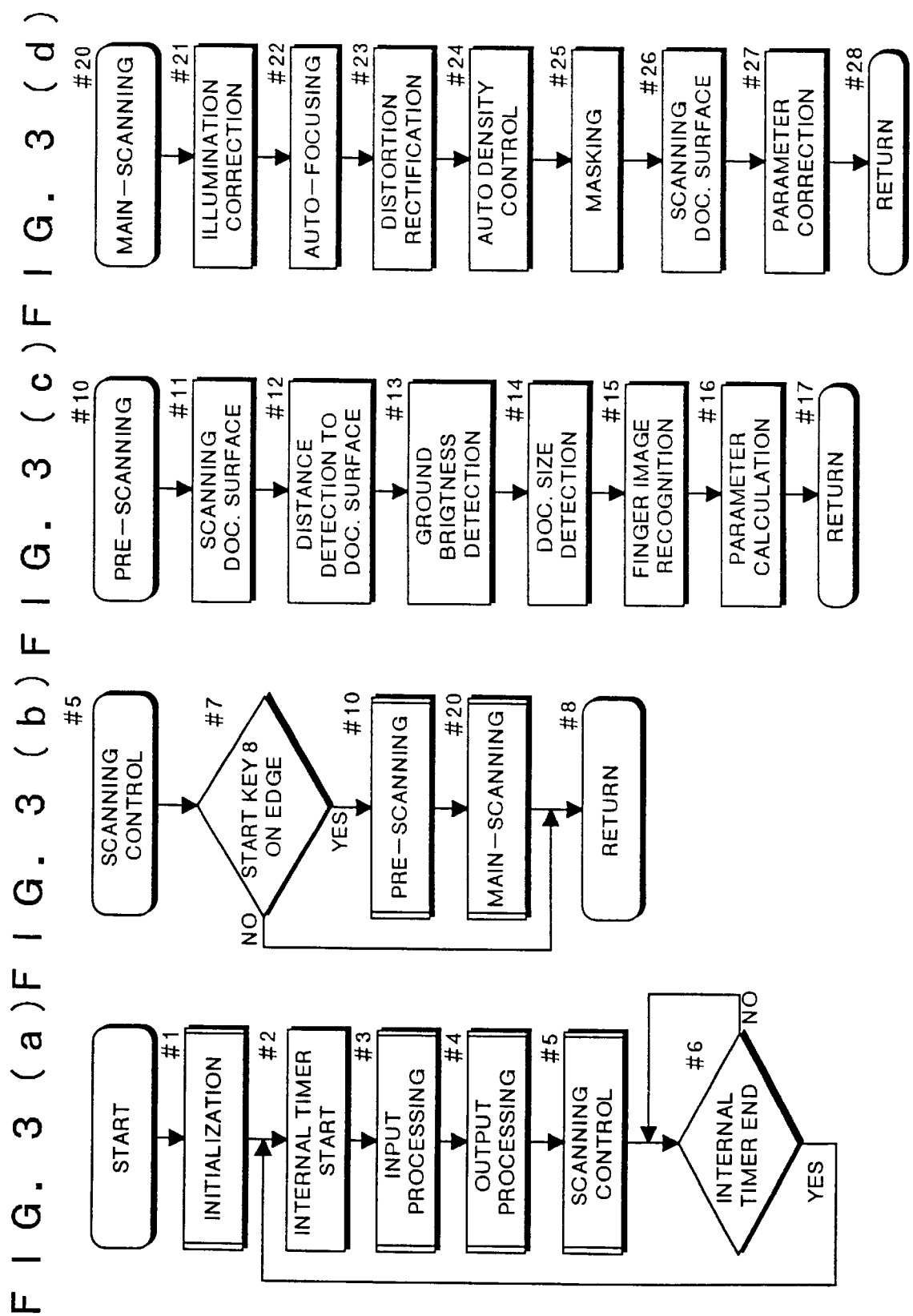

FIG. 3(a). FIG. 3(b), FIG. 3(c), and FIG. 3(d) are flowcharts showing schematic operations of the image reading apparatus 1. FIG. 3(a) is a main flowchart. When a power source of the image reading apparatus 1 is ON, various initialization are executed (#1), an internal timer is started (#2). Then inputting process of various data is executed (#3), and the outputting processing of the data is executed (#4), and after control of scanning operation is executed (#5), it waits until the internal timer is over (#6), then one routine is completed. This routine is repeated until the power source is turned off.

Now, the scanning control (#5) will be explained referring to FIG. 3(b), according to image reading operation of the image reading apparatus. Here, it waits until ON edge of the start key 8 is detected (#7). "ON edge" means that when the start key 8 is turned over from OFF to ON, and it detects whether the start key 8 is pushed or not by an operator. When it is detected the start key 8 is pushed, a pre-scanning is executed (#10). In the pre-scanning operation, a document surface is scanned (#11) as shown in FIG. 3(c), and following proceedings are executed; a distance measurement which detects a distance from image pickup sensor to a document surface for auto-focusing (#12), a ground density detection which detects a document ground density in the part with no images for auto-density control (#13), a document size detection (#14), finger image recognition for erasing images of fingers of an operator pushing down a document (#15). Further, a calculation of parameter is executed for image rectification and processing (#16).

When the pre-scanning is completed, a main-scanning is executed (#20). As shown in FIG. 3(d), in the main-scanning operation, following proceedings are executed; an illumination correction of the illumination unit 6 (#21). an auto-focusing for imaging in focus state by driving the projection lens 12 (#22). a document distortion rectification (#23), an auto-density control (#24), a masking for removing off unnecessary finger images of an operator (#25), and the like. Also, a document surface is scanned by executing a sensor drive control for image reading operation (#26). The scanned document image is converted from analog to digital, and a parameter is corrected (#27), and afterwards it is outputted to a printer and the like.

Figure 4:
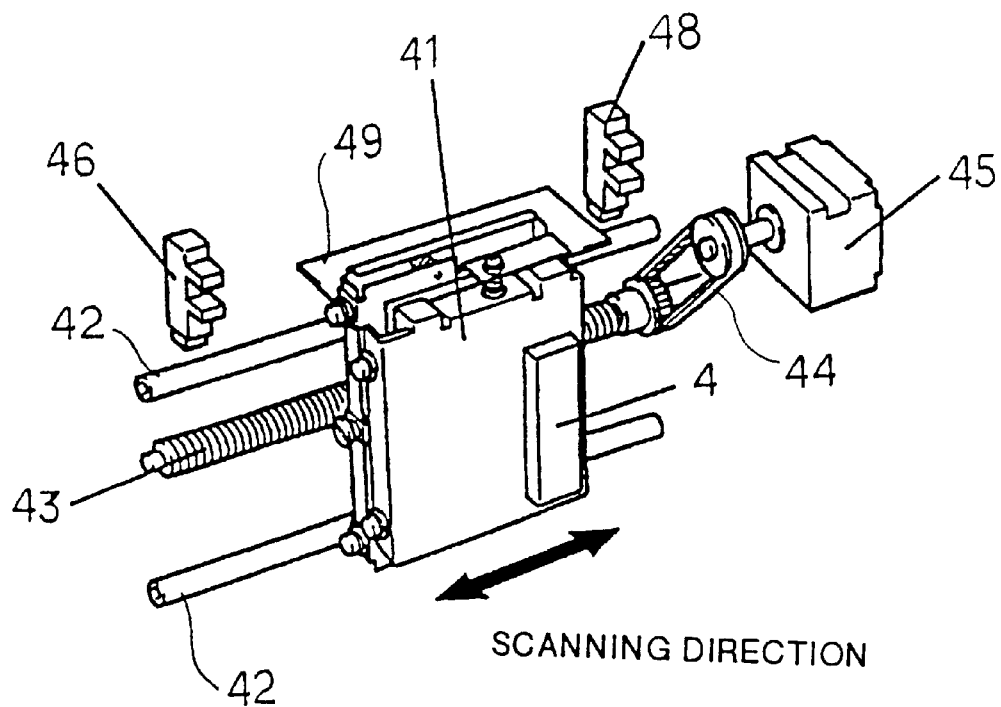
FIG. 4 is a view showing a construction of a sensor drive control means.

FIG. 4 shows a construction of a sensor drive control means 23a for scanning of an image pickup sensor 4. One-dimensional CCD sensor is used for the image pickup sensor 4, and the picture elements of the CCD are arranged as to correspond to longitudinal direction of a document, and it is driven linearly in perpendicular direction to that. A scanner 41 having the image pickup sensor 4 is restricted its movement in lateral direction by two guide shafts 42. One of the two guide shafts 42 is a sliding shaft and the other is a shaft for limiting a pivot. A feed screw 43 is applied for a feeding function of the scanner 41, and the scanner 41 with CCD is driven in lateral direction by that a scanner motor 45 rotates the feed screw 43 through a belt 44. The CPU 21 outputs signals for driving the scanner motor 45 and controls its rotational direction and number.

Photoelectric sensors 46 and 48 are applied for controlling a position of the scanner 41. In the sensor, a light emitting unit and a light receiving unit are arranged at a certain distance, and it detects the position of the scanner from in and out movement of a light shielding plate 49 which is fixed to the scanner 41 between the light emitting unit and light receiving unit. The photoelectric sensor 46 is the first home positioning sensor as well as a home sensor for detecting an initial position such as a position when a power source is turned ON. The sensor 48 is a limit sensor for avoiding runaway of the scanner 41.

Figure 5:
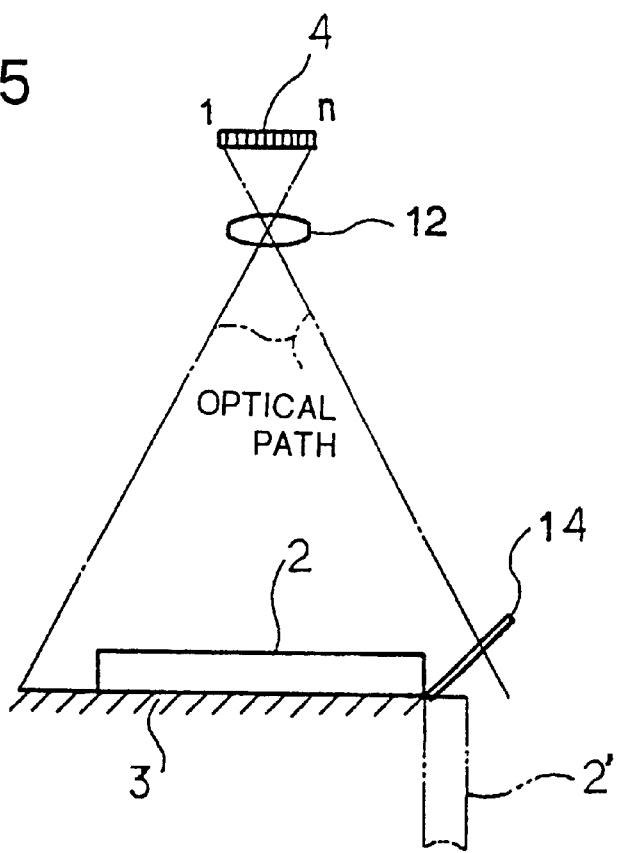
FIG. 5 is a view showing a method of document height detection.

FIG. 5 is a view showing a method of document height detection according to the image reading apparatus. By placing the document 2 in a predetermined position, a mirror image 2' of the document upper side plane is formed on a prolonged plane of an image of the document table 3 by a distance measuring mirror 14. A distribution of the document height can be obtained from this image of the document upper side plane. In the figure, a chain line shows a scope of reading out by the image pickup sensor 4, and 1~n shows pixels of the image pickup sensor 4.

FIG. 6 shows an example of a read out document image data by the image reading apparatus. Images of the document surface and the document upper side plane are read out as if they are curved longitudinally due to a variation of document height. Since the document surface and upper side plane are illuminated by an illumination unit 6, they are read out in white. Contrarily, the document table 3 colored thicker than the document ground and a background portion mirrored on the distance measuring mirror 14 have a small quantity of reflection light, therefore they are read out in black.

FIG. 7 shows an example of output per one line of main-scanning direction that read out by the image pickup sensor 4. The lateral axis shows the number of pixels of the image pickup sensor 4 (right:rearward, left:forward), and the vertical axis shows an output of the sensor. L1 is a threshold value of illuminance, n1 is a minimum value of pixels which passes over the threshold value L1, n2 is a pixel which corresponds to a height 0 millimeter (fixed value), and n3 is a maximum value of pixels which passes over the threshold value L1 in a value bigger than n2. (n2–n3) is the number of pixels which corresponds to the document height.

When the image pickup sensor 4 moves right and left (in sub-scanning direction), the value n1 varies in accordance with the document height, and a variation of the pixels' numbers corresponding to the height can be obtained. Then, a document height data can be obtained by dividing this number of pixels by resolution of image pickup device.

Figure 8:
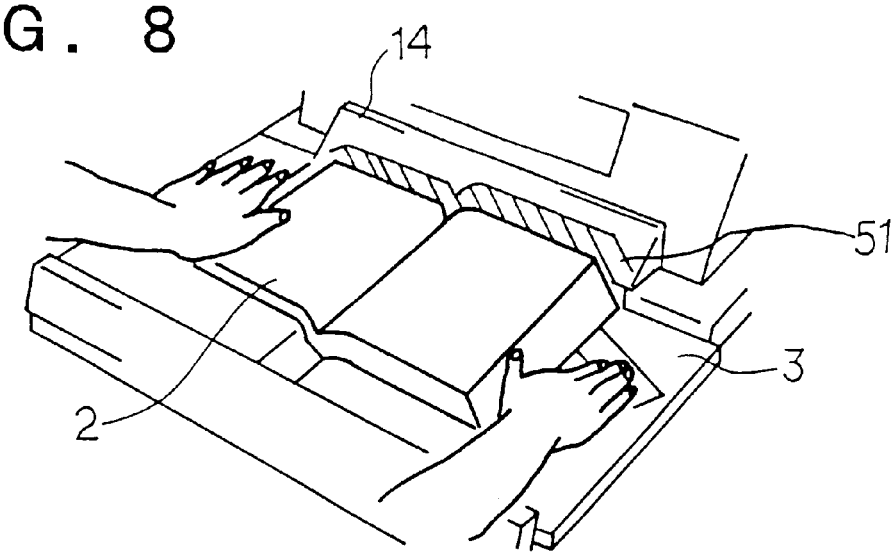
FIG. 8 is a view showing a state of operation on photographing.
Figure 9:
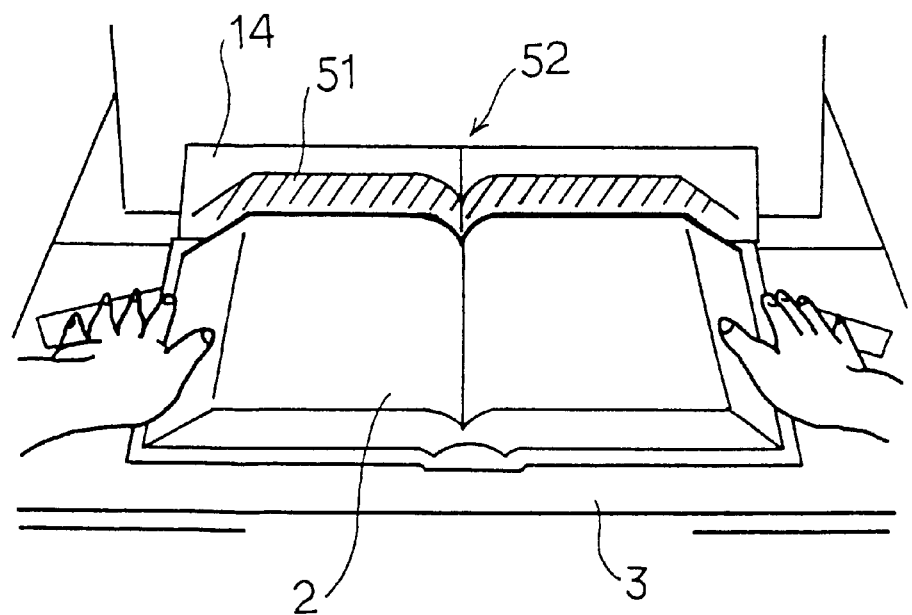
FIG. 9 is a view showing a document table from an operator's view point, and showing an example that center marks are drawn on a distance measuring mirror.

FIG. 8 shows a state of operations at image reading. A mirror image 51 of the document upper side plane is mirrored on the distance measuring mirror 14. FIG. 9 shows a document table 3 from the view of an operator. The mirror image 51 of the document upper side plane is seen continuously to a forehead of the document 2. On the distance measuring mirror 14, a center mark 52 (indication means), which is a reference position of fitting the center of the document 2, is drawn. The center mark 52 is printed in a glossy ink as not to prevent projecting of the document upper side plane to an image reading system. An operator executes positioning of the document 2 on the document table 3 by moving it right and left as to fit the mirror image 51 of the document upper side plane with the center mark 52. A height detection of the document 2 is executed at a certain interval. When the document 2 such as a book is placed correctly, a position of the center mark 52 is the document bound portion, therefore, there is no need to detect the distance, then detection of the document height of the bound portion may not be executed.

Figure 10:
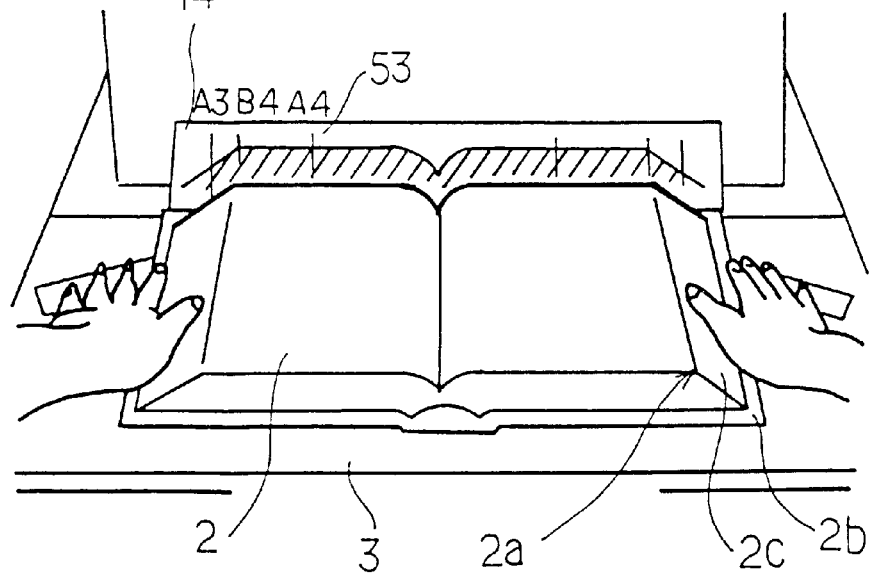
FIG. 10 is a view showing an example that indication marks which indicates document sizes are drawn on the distance measuring mirror.
Figure 11:
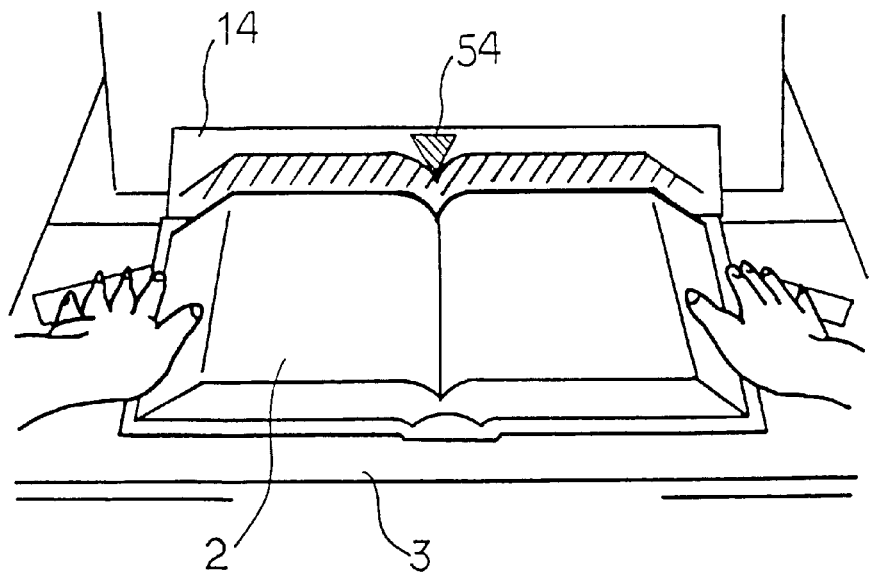
FIG. 11 is a view showing an example that an angle mark for indicating maximum angle of a document surface's inclination is drawn on the distance measuring mirror.

FIGS. 10 and 11 show other examples of indication means except for the above-mentioned the center mark. FIG. 10 is an example that indication mark 53, which shows a document size, is drawn on a distance measuring mirror 14. Since an indication of sizes has been drawn on a document table according to a conventional apparatus, there has been a difficulty in recognizing the central position of a thick bookform document besides there has been a difficulty in recognizing the size of a document correctly, due to uneven document height. Further, as shown in FIG. 10, the size of a document has been recognized incorrectly since a bookform document often has a jacket which is bigger than its pages (an edge of a page 2a), and a skirt part 2c which spreads to right and left of the document. Then, the indication mark 53, which indicates document sizes, is drawn on the distance measuring mirror 14 in this embodiment so that an operator can recognize a document size correctly by fitting the indication mark 53 with the edge of a page 2a.

FIG. 11 is an example that an indication mark 54, which indicates an allowable maximum angle of a document surface's inclination, is drawn on the distance measuring mirror 14. When a document with a firm bound portion is placed opened and upward, the document surface tends to have a great incline angle excessively, and it is difficult to read out the document's letters, which are crushed due to the great incline angle of the document surface. Therefore, in this example, the indication mark 54 for indicating an angle, is drawn on the distance measuring mirror 14 so that an operator can recognize a limitation of incline angle at a document bound portion by comparing the indication mark 54 and the bound portion of the document upper side plane image mirrored on the mirror. If the incline angle is too great, the positioning manner may be changed, for example, an operator opens up the document to be photographed.

According to the image reading apparatus in the embodiment, the center mark 52, the indication mark 53 for detecting a document size, and the indication mark 54 for document's incline angle are drawn on the distance measuring mirror 14, and an accurate positioning of the document 2 can be executed on the document table 3 by comparing these marks and a mirror image of the document upper side plane. Furthermore, when a thick book is placed opened and face-up and photographed on the document table which is divided a plural planes and constructed as to be movable vertically for reducing unevenness of a document surface to be read out, the same effect as above-mentioned can be obtained by drawing those indication marks on the distance measuring mirror 14.

Figure 12:
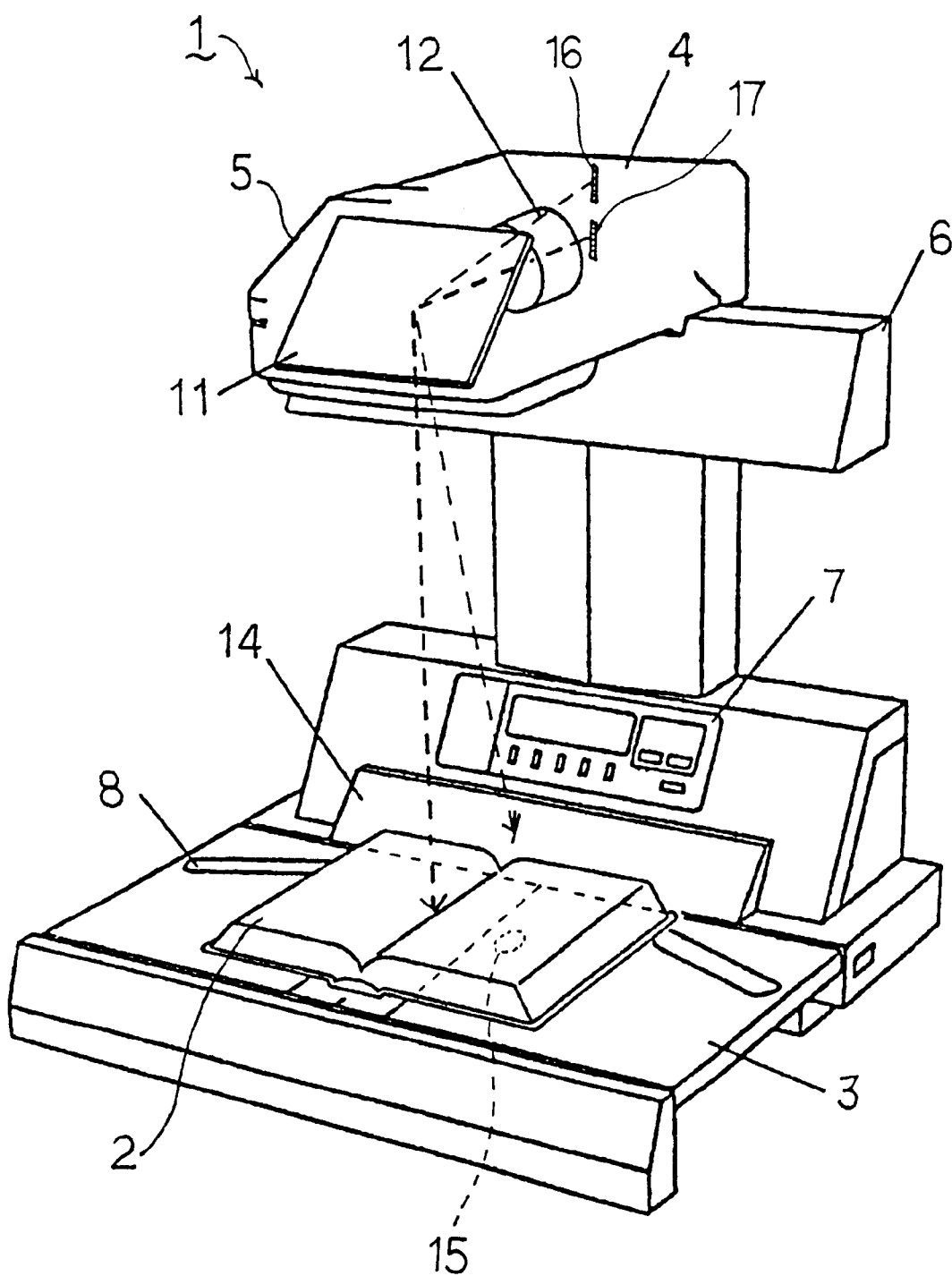
FIG. 12 is a view showing a state that light emitting elements are arranged in a photographing camera of an image reading apparatus according to the second embodiment of the present invention.

The second embodiment will be explained referring to FIG. 12. Light emitting units 16 and 17 are composed of a plural LEDs (or laser diodes), and they emit a light when it is detected that a document 2 is placed on a document table 3 by a document detection sensor 15. An optical path of the light from the LED is converted at a projection lens 12 and a reflection mirror 11, and then it is projected to the document table 2 or the distance measuring mirror 14 as a reference mark for document positioning. During a pre-scanning and main-scanning operation in the image reading apparatus 1, light from the light emitting units 16 and 17 is not projected to the document table 2 nor the distance measuring mirror 14. Therefore, it does not read out an unnecessary projected image from the light emitting units 16 and 17. Concretely, it can be done by turning off the light emitting units 16 and 17, or by shading the light from the same and further by a construction that light projecting position differs from reading position.

If the light emitting units 16 and 17 are controlled as to emit a light in accordance with a size of the document 2 detected by size recognition means, the light from the light emitting units can be an indication mark for a document size not a reference mark to be fitted with the center of the document 2. In this manner, as the light from the light emitting units 16 and 17 is projected on the document surface, an operator can placed the document 2 on the document table easily by recognizing the mark projected on the document 2.

Figure 13:
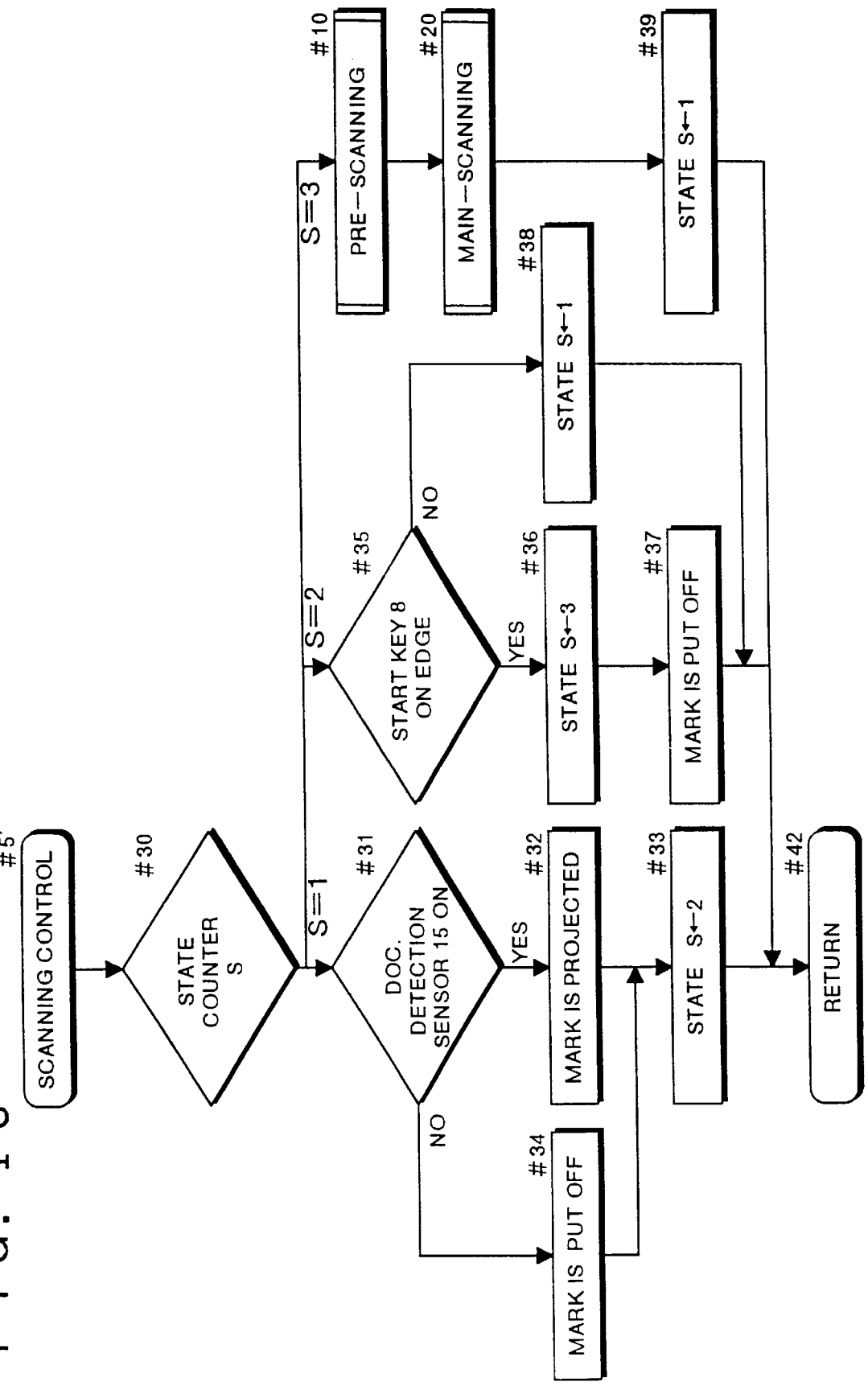
FIG. 13 is a flowchart showing a scanning control according to the second embodiment.

Then, proceedings of the second embodiment will be now explained referring to a flowchart in FIG. 13. The proceedings except for scanning control is omitted here because it is the same in the first embodiment. In a sub-routine of scanning control (#5'), the step proceeds to a predetermined step in accordance with a value of a state counter (#30). An initial state value is set in 1. Then, it is judged whether the document detection sensor 15 is ON or not (#31). When it is ON, that is, when a document 2 is placed on a document table 3, an indication mark is projected (#32). When any document is not detected, the mark is put off (#34). Then it changes to a state 2 (#33). Next, it is judged whether a start key is pushed or not (#35), if it is pushed, it changes to a state 3 (#36), and the mark is put off (#37). When the start key is not pushed, it changes to a state 1 (#38). At the state 3, a pre-scanning (#10) and a main-scanning (#20) Is executed, and then it returns to the state 1 (#39).

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An image reading method which reads out a document image of an opened, face-up book, comprising
   a step of positioning the book on a document table;
   a step of detecting the size of the book on the document table:
   a step of projecting marks for positioning the book on the document table, the marks being projected in accordance with the detected size of the book;
   a step of fitting the book with the marks; and
   a step of reading out the document image of the opened, face-up book placed on the document table.

2. The image reading method as claimed in claim 1, wherein the marks are not projected at image reading.

3. An image reading apparatus which reads out a document image of a book placed open and face-up, comprising:
   a document table upon which the book is placed opened and face-up;
   an image reading device for reading out the document image of the book placed on the document table;
   a mirror for imaging the upper side plane of the book on the document table;
   means for detecting a size of the book; and
   a projection device, responsive to the detected size of the book, for projecting a mark onto one of the document table and the mirror, the mark being used to position the book on the document table.

4. The image reading apparatus according to claim 3, further comprising:
   an image processing unit, responsive to the read out document image of the opened, face-up book and the imaged upper side plane of the book, for rectifying distortion in the read out document image of the book.

5. The image reading apparatus according to claim 3, wherein the image reading device simultaneously reads out the document image of the opened, face-up book and the upper side plane of the book.

6. The image reading apparatus according to claim 3, wherein projection of the mark is prohibited during reading out a document image by the image reading device.

* * * * *